(12) United States Patent
Akiyama et al.

(10) Patent No.: US 10,343,904 B2
(45) Date of Patent: Jul. 9, 2019

(54) MEMBER FOR HYDROGEN PRODUCTION AND HYDROGEN PRODUCTION APPARATUS

(71) Applicant: KYOCERA CORPORATION, Kyoto-shi, Kyoto (JP)

(72) Inventors: Masahide Akiyama, Kirishima (JP); Takeshi Ohkuma, Kirishima (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/061,685

(22) PCT Filed: Nov. 15, 2016

(86) PCT No.: PCT/JP2016/083771
§ 371 (c)(1),
(2) Date: Jun. 13, 2018

(87) PCT Pub. No.: WO2017/104331
PCT Pub. Date: Jun. 22, 2017

(65) Prior Publication Data
US 2018/0370794 A1    Dec. 27, 2018

(30) Foreign Application Priority Data

Dec. 14, 2015   (JP) .................................. 2015-243303
May 20, 2016    (JP) .................................. 2016-101596

(51) Int. Cl.
*C01B 3/06*     (2006.01)
*C01D 17/00*    (2006.01)
(Continued)

(52) U.S. Cl.
CPC ................ *C01B 3/061* (2013.01); *C01B 3/06* (2013.01); *C01D 17/00* (2013.01); *C01G 25/02* (2013.01);
(Continued)

(58) Field of Classification Search
CPC ........... C01B 3/061; C01B 3/06; C01D 17/00; C01G 25/02; C01G 49/00; C04B 35/48; C04B 35/50
(Continued)

(56) References Cited

U.S. PATENT DOCUMENTS 5,168,080 A   * 12/1992   Suzuki ................... C04B 35/584
                                                     264/647
2013/0336879 A1* 12/2013 Yamazaki ............... C01B 3/042
                                                     423/658.2
2015/0125383 A1*  5/2015  Yamazaki ............. C07C 29/159
                                                     423/658.2

FOREIGN PATENT DOCUMENTS

EP        3421443 A1       1/2019
JP        2009263165 A    11/2009
WO        2017145903 A1    8/2017

* cited by examiner

*Primary Examiner* — Huy Tram Nguyen
(74) *Attorney, Agent, or Firm* — Viering, Jentschura & Partner Mbb

(57) ABSTRACT

A member for hydrogen production includes a ceramic composite in which a plurality of ceramic particles having an average particle diameter ranging from 5 nm to 200 nm are dispersed in a porous insulator having a different component from the ceramic particles. The ceramic particles comprise at least one substance selected from the group consisting of $AXO_{3\pm\delta}$ (where $0\leq\delta\leq1$, A: at least one of rare earth elements, alkaline earth elements, and alkali metal elements, X: at least one of transition metal elements and metalloid elements, and O: oxygen), cerium oxide, and zirconium oxide as a main component.

15 Claims, 6 Drawing Sheets

(51) Int. Cl.
*C01G 25/02* (2006.01)
*C01G 49/00* (2006.01)
*C04B 35/48* (2006.01)
*C04B 35/50* (2006.01)

(52) U.S. Cl.
CPC .............. *C01G 49/00* (2013.01); *C04B 35/48* (2013.01); *C04B 35/50* (2013.01); *C04B 2235/3229* (2013.01); *C04B 2235/3244* (2013.01); *C04B 2235/5445* (2013.01); *C04B 2235/5454* (2013.01); *Y02E 60/36* (2013.01); *Y02P 20/134* (2015.11)

(58) Field of Classification Search
USPC ........................................................ 422/129
See application file for complete search history.

MEMBER FOR HYDROGEN PRODUCTION AND HYDROGEN PRODUCTION APPARATUS

CROSS-REFERENCE TO RELATED APPLICATIONS

This application is a national stage application claiming priority to International Application No. PCT/JP2016/083771, filed on Nov. 15, 2016, which claims priority to Japanese Patent Application No. 2015-243303, filed on Dec. 14, 2015; and claims priority to Japanese Patent Application No. 2016-101596, filed on May 20, 2016; all of which are herein incorporated by reference for all purposes.

FIELD

This disclosure relates to a member for hydrogen production and a hydrogen production apparatus.

BACKGROUND

In recent years, as a solution to problems such as global warming due to an increase in carbon dioxide associated with the consumption of fossil fuels, clean renewable energy that does not emit carbon dioxide has attracted attention instead of the fossil fuels.

Solar energy, which is one of the renewable energy, has no worry of exhaustion. The use of the solar energy can contribute to the reduction in greenhouse gases. Under such circumstances, an energy system in which primary energy is sought from solar light and secondary energy is supported by hydrogen is one of the ideal clean energy systems. Establishment of such an energy system is an urgent matter.

As one method of converting solar energy into chemical energy, for example, the use of ceramic members such as ceria ($CeO_2$) as a reaction system carrier has been developed. This method utilizes a two-step hydrolysis reactions occurring in the reaction system carrier (for example, refer to Patent Literature 1).

Specifically, first of all, in a first step, the ceramic member as the reaction system carrier is heated to 1400° C. to 1800° C. using solar energy. In this first step, oxygen is generated by the reduction of the ceramic member.

Subsequently, in a second step, the reduced ceramic member is cooled to 300° C. to 1200° C. In this second step, the ceramic member is reacted with water. In this reaction, the reduced ceramic member is oxidized to generate hydrogen.

CITATION LIST

Patent Literature

Patent Literature 1: Japanese Laid-open Patent Publication No. 2009-263165

SUMMARY

A member for hydrogen production of the present disclosure includes a ceramic composite in which a plurality of ceramic particles having an average particle diameter of 5 nm to 200 nm are dispersed in a porous insulator having a different component from the ceramic particles, in which the ceramic particles comprise at least one substance selected from the group consisting of $AXO_{3\pm\delta}$ (where $0\leq\delta\leq1$, A: at least one of rare earth elements, alkaline earth elements, and alkali metal elements, X: at least one of transition metal elements and metalloid elements, and O: oxygen), cerium oxide, and zirconium oxide as a main component.

A hydrogen production apparatus of the present disclosure includes a reaction unit configured to cause oxidation-reduction reactions by receiving solar energy, a water supply unit configured to supply water to the reaction unit, and a recovery unit configured to recover hydrogen gas generated from the reaction unit, in which the above member for the hydrogen production is provided in the reaction unit.

BRIEF DESCRIPTION OF DRAWINGS

FIG. 2A illustrating the case where the light absorbing member is a metal particle-containing composite; and FIG. 2B illustrating the case where the light absorbing member is a metal-based film laminated product.

FIG. 4A illustrating the state where oxygen is generated from the member for hydrogen production; and FIG. 4B illustrating the state where hydrogen is generated from the same member for hydrogen production.

FIGS. 5A, 5B and 5C illustrating a flat plate type structure, a coaxial type of a hollow cylindrical structure, and a non-coaxial type of a hollow cylindrical structure, respectively.

DESCRIPTION OF EMBODIMENTS

Figure 1:
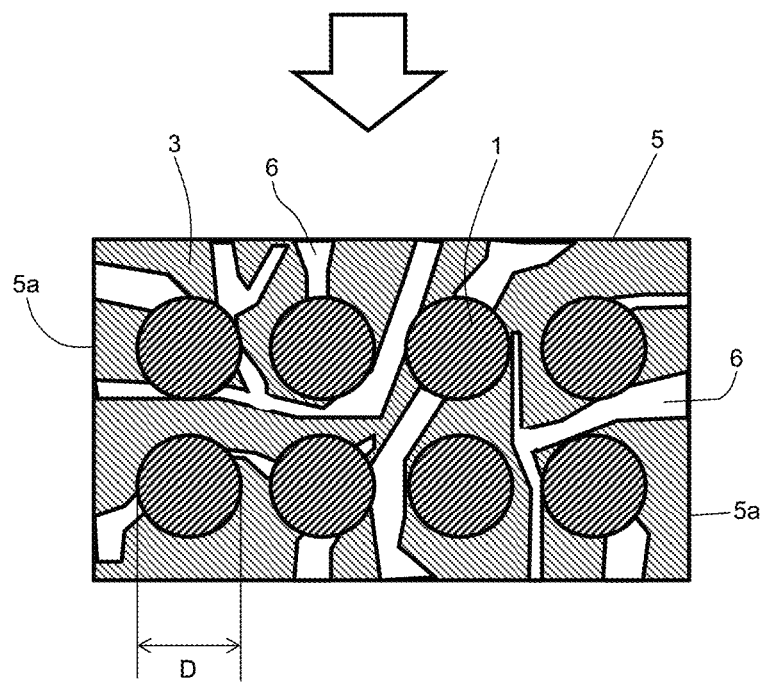
FIG. 1 is a sectional view schematically illustrating one embodiment of a member for hydrogen production of this disclosure.

FIG. 1 is a sectional view schematically illustrating one embodiment of the member for hydrogen production of this disclosure. The member for hydrogen production according to the present embodiment is made of a ceramic composite 5 in which fine ceramic particles 1 are dispersed in a porous insulator 3.

The insulator 3 is formed of a material the main component of which is different from the material of the ceramic particles 1. As the material of the insulator 3, silicon oxide, aluminum oxide, zinc oxide, oxides of alkaline earth elements, oxides of rare earth elements, and composite oxides thereof are suitable materials. In this case, the insulator 3 has many open pores 6 and the open pores 6 extend in such a manner that the pores reach from an outer surface 5a of the ceramic composite 5 to the inner ceramic particles 1. In this case, the open porosity is 10% or higher. As the open porosity of the insulator 3, a value measured for the ceramic composite 5 including the ceramic particles 1 is used. This is because the ceramic particles 1 are dense bodies and the porosity of the insulator 3 directly corresponds to the porosity of the ceramic composite 5.

The ceramic particles 1 includes at least one substance selected from the group consisting of $AXO_{3\pm\delta}$ (where $0\leq\delta\leq1$, A: at least one of rare earth elements, alkaline earth elements, and alkali metal elements, X: at least one of transition metal elements and metalloid elements, and O: oxygen), cerium oxide, and zirconium oxide as a main component. In this case, the average particle diameter of the ceramic particles 1 (represented by a symbol D in FIG. 1) is 5 nm to 200 nm. The rare earth element may be or include a lanthanide element. The transition metal element may be or include, but is not limited to, Ti, V, Cr, Mn, Zr, Nb, Ta, or combinations thereof. The metalloid element may be or include, but is not limited to, B, Si, Ge, As, Se, Sb, Te, Po, At, or combinations thereof. As examples of a combination of plural species from the group consisting of $AXO_{3\pm\delta}$, cerium oxide, and zirconium oxide, a composite oxide in which a part of zirconium oxide is replaced by cerium oxide can be exemplified.

The main component refers to, for example, a ceramic composite 5 having a proportion of 60% by mass or larger determined from Rietveld analysis using X-ray diffraction.

When the ceramic particles 1 having the above main component are placed in a high temperature environment, a defective reaction expressed by Formula (1) occurs.

$$O_o \rightleftharpoons V_{\ddot{O}} + 2e' + \frac{1}{2}O_2(g)\uparrow \quad (1)$$

$V_{\ddot{O}}$: Oxygen hole $2e'$: Electron

In this case, the ceramic particles 1 constituting the ceramic composite 5 are fine and thus the electrons generated in the ceramic particles 1 by the above defect reaction tend to stay on the surfaces of the ceramic particles 1. This enhances the surface plasmon effect for the ceramic particles 1. Therefore, the ceramic composite 5 itself can be changed into a high temperature state. As a result, the ceramic particles 1 themselves can have a function of absorbing light.

When the ceramic particles 1 causing such a reaction exist in the porous insulator 3, the ceramic particles 1 cause a reaction in which oxygen is released (hereinafter referred to as an "oxygen release reaction" in some cases) in a high temperature state as represented by Formula (2). On the other hand, at a temperature lower than the temperature at which the oxygen release reaction occurs, the ceramic particles 1 cause a reaction that generates hydrogen (hereinafter referred to as a hydrogen production reaction in some cases) as represented by Formula (3).

$$MO_{ox} = MO_{red} + \frac{1}{2}O_2 \quad (2)$$

MO: Metal oxide
OX: Oxidation state
Red: Reduction state $$MO_{red} + H_2O = MO_{ox} + H_2 \quad (3)$$

This is because the surface plasmon effect appears on the ceramic particles 1 due to the above defect reaction and, in addition, the above oxidation/reduction reactions occur in the insulator 3 constituting the ceramic composite 5.

In this case, as the ceramic particles 1, the smaller the average particle diameter becomes, the more the surface plasmon effect can be expected. However, the ceramic particles 1 having an average particle diameter of less than 5 nm are difficult to prepare currently. On the other hand, when the ceramic particles 1 have an average particle diameter of larger than 200 nm, the surface plasmon effect is difficult to be developed. Therefore, the ceramic composite 5 itself cannot be brought into the high temperature state. As a result, hydrogen is difficult to generate.

From the viewpoint of enhancing the surface plasmon effect of the ceramic particles 1, the proportion of the ceramic particles 1 included in the ceramic composite 5 may range from 20% to 80% in a volume ratio. The ceramic particles 1 may exist dispersedly in an isolated state as a single particle in the insulator 3 in an amount of 90% or more. Namely, in the member for hydrogen production according to the present embodiment, the ceramic particles 1 individually exist at a ratio in the number of particles of 90% or more in the material constituting the insulator 3.

The proportion of the ceramic particles 1 existing inside the ceramic composite 5 is obtained by using an electron microscope and an analyzer attached thereto (EPMA) by observing the section of the ceramic composite 5. For example, the ceramic composite 5 is polished to expose the ceramic particles 1 and a predetermined region where 30 to 100 ceramic particles 1 exist in the section is specified. Subsequently, the area of this region and the total area of the ceramic particles 1 existing in this region are obtained and the total area of the ceramic particles 1 relative to the area is obtained. The area proportion thus obtained is defined as the volume proportion. Whether the ceramic particles 1 exist in the isolated state as a single particle in the insulator 3 is also determined by counting the number of the particles from the above observation.

Figure 2A:
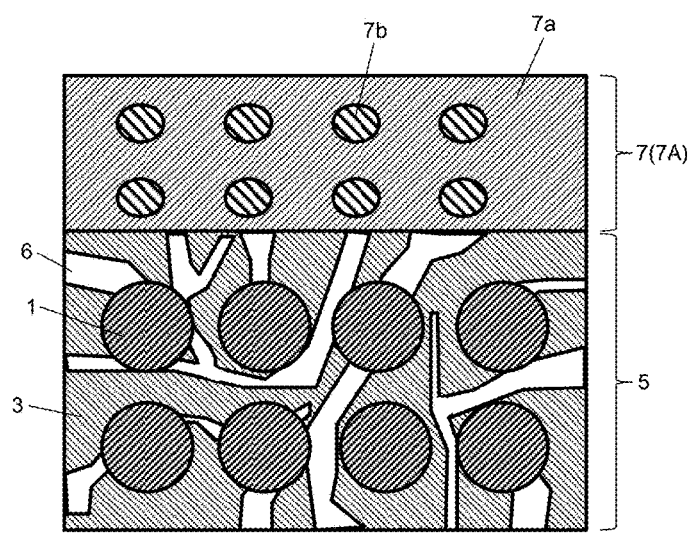
FIGS. 2A and 2B illustrate other aspects of the present embodiment and are schematic views illustrating the member for hydrogen production in which a light absorbing member is provided on a ceramic composite.
Figure 2B:
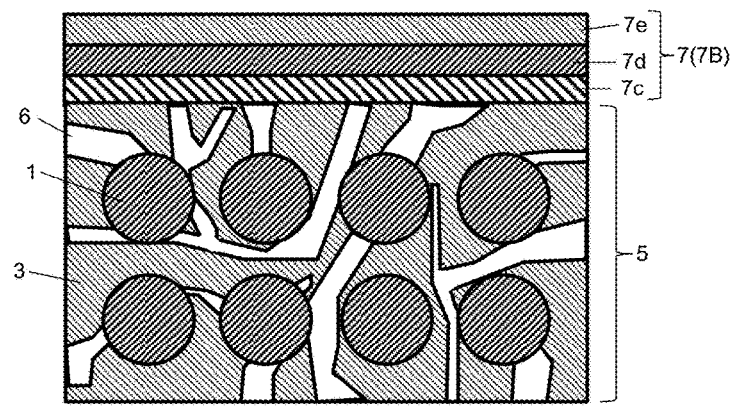

FIGS. 2A and 2B illustrate other aspects of the present embodiment and are schematic views illustrating the member for hydrogen production in which a light absorbing member is provided on a ceramic composite. FIG. 2A illustrates the case where the light absorbing member is a metal particle-containing composite and FIG. 2B illustrates the case where the light absorbing member is a metal film laminated product.

For the member for hydrogen production according to the present embodiment, as a method of further increasing the temperature of the ceramic composite 5, a light absorbing member 7 being a heat medium from the outside may be provided on the ceramic composite 5 as illustrated in FIGS. 2A and 2B.

A metal particle-containing composite 7A illustrated in FIG. 2A is obtained by dispersing metal particles 7b in a dense sintered ceramic product 7a. In this case, the metal particle-containing composite 7A absorbs sunlight and thus the free electrons existing in the metal particles 7b develop a surface plasmon effect, whereby the metal particle-containing composite 7A itself generates heat. As the metal particles 7b, one of the metals selected from the group consisting of tungsten, molybdenum, niobium, nickel, copper, silver, gold, platinum, and palladium can be selected. As the metal particles 7b, a compound in which carbon (C) or nitrogen (N) is bonded to a metal or both of carbon (C) and nitrogen (N) are bonded to a metal can be applied instead of the above metals. As the compound, at least one compound selected from the group consisting of tantalum carbide (TaC), vanadium carbide (VC), titanium nitride (TiN), titanium carbide (TiC), titanium carbonitride (TiCN), niobium carbide (NbC), and niobium nitride (NbN) can be exemplified.

Also in this case, the size (average particle diameter) of the metal particles 7b is fine from the viewpoint of enhancing the surface plasmon effect similar to the case of the ceramic composite 5 described above. The average particle diameter of the metal particles 7b ranges from 5 nm to 50 nm, for example. On the other hand, the open porosity of the sintered ceramic product 7a surrounding the metal particles 7b may be 5% or lower. As the sintered ceramic product 7a, a low thermal expansion glass containing silicon oxide as a main component is suitable because the glass has high light transparency and excellent heat resistance. As the material for the sintered ceramic product 7a, the material composed of the same components as the components of the insulator 3 constituting the ceramic composite 5 can also be used.

Examples of a metal-based film laminated product 7B illustrated in FIG. 2B include, but not limited to, a laminated product in which a tungsten film 7c, an iron silicide (FeSi) film 7d, and a silicon oxide film 7e are formed in layers, for example. In this case, the tungsten film 7c and the iron silicide film 7d formed on the lower layer side of the silicon oxide film 7e have a role of absorbing light in a specific wavelength region. At the same time, the silicon oxide film 7e being a dielectric substance achieves a function to reduce radiation from the metal-based film laminated product 7B.

Figure 3A:
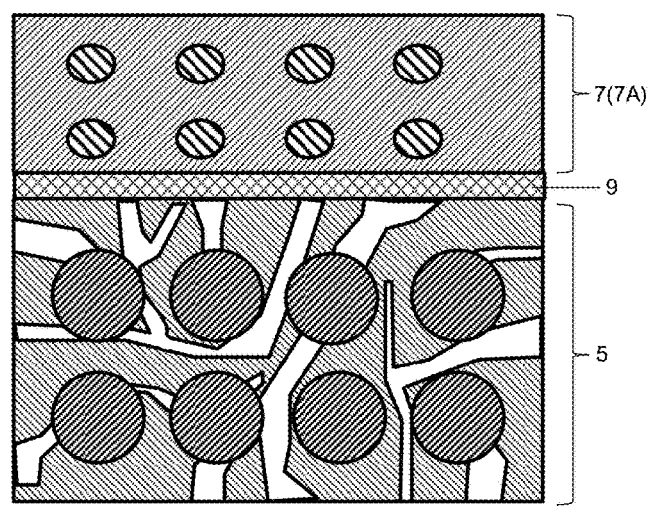
FIGS. 3A and 3B are schematic sectional views illustrating constitutions in which a metal film is provided to each of the members for hydrogen production illustrated in FIGS. 2A and 2B.
Figure 3B:
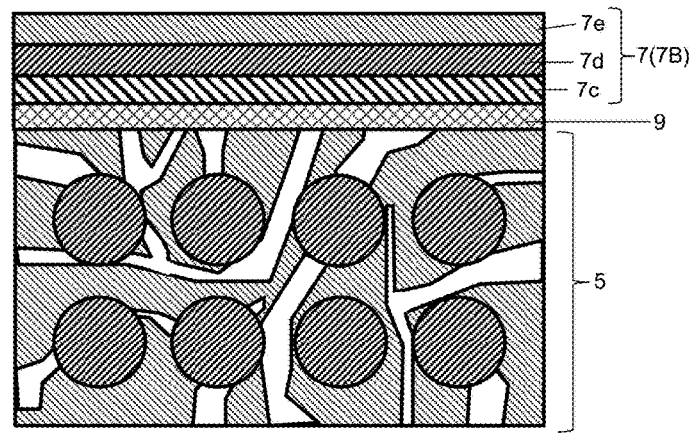

In the member for hydrogen production according to the present embodiment, a metal film 9 may be interposed between the ceramic composite 5 and the light absorbing member 7. As illustrated in FIGS. 3A and 3B, when the metal film 9 is provided between the ceramic composite 5 and the light absorbing member 7, the light incident to the light absorbing member 7 is reflected at the surface of the metal film 9. Therefore, the light incident to the light absorbing member 7 is difficult to permeate to the ceramic composite 5 side. This allows the light to concentrate inside the light absorbing member 7. Therefore, the amount of heat generated by the light absorbing member 7 can be increased. As the material of the metal film 9, any metal having high light reflectivity may be used. For example, tungsten, molybdenum, nickel, copper, silver, gold, platinum, palladium, and the like are suitable.

Figure 4A:
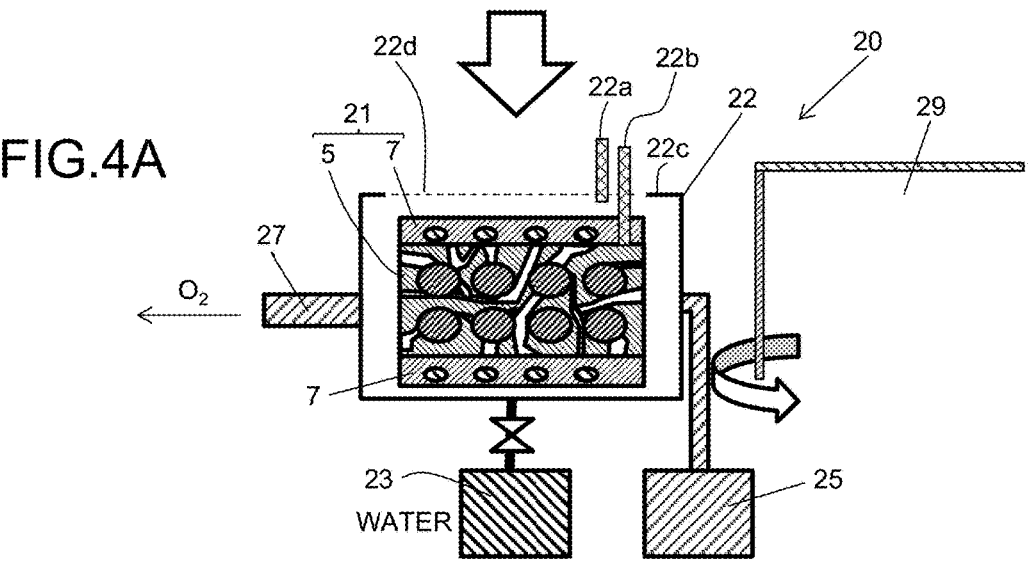
FIGS. 4A and 4B are sectional views schematically illustrating states when the hydrogen production apparatus according to the present embodiment is operated.
Figure 4B:
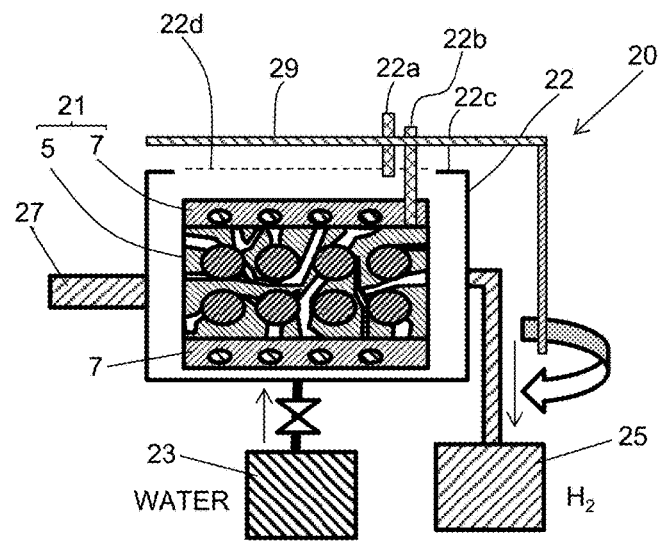

FIGS. 4A and 4B are sectional views schematically illustrating states when the hydrogen production apparatus according to the present embodiment is operated. FIG. 4A illustrates the state where oxygen is generated from the member for hydrogen production and FIG. 4B illustrates the state where hydrogen is generated from the same member for hydrogen production.

A hydrogen production apparatus 20 according to the present embodiment includes a reaction unit 21 configured to cause oxidation-reduction reactions by receiving solar energy (a white arrow illustrated in FIG. 4A), a water supply unit 23 configured to supply water to the reaction unit 21, and a recovery unit 25 configured to recover hydrogen gas generated from the reaction unit 21. In this case, the reaction unit 21 has a light absorbing member 7 configured to convert sunlight into heat and a member for hydrogen production configured to generate hydrogen when the reaction unit 21 is heated. The member for hydrogen production has the ceramic composite 5 described above. A discharge port 27 configured to discharge oxygen is attached to the reaction unit 21. In the hydrogen production apparatus 20, a shielding plate 29 configured to allow the reaction unit 21 to receive or shield sunlight is provided. The shielding plate 29 may be an opaque plate and any material such as plastic, metal, and wood can be used.

As illustrated in FIG. 4A, when the shielding plate 29 is moved from the upper surface of the reaction unit 21, the ceramic composite 5 being the member for hydrogen production receives light (sunlight). As a result, the ceramic composite 5 being the member for hydrogen production located in the reaction unit 21 is in a high temperature state and thus the ceramic composite 5 causes the reduction reaction represented by Formula (2) to generate oxygen.

Subsequently, as illustrated in FIG. 4B, when the reaction unit 21 is covered with the shielding plate 29, the reaction unit 21 is shielded from sunlight. At this time, when water is supplied to the reaction unit 21 to bring into contact with the ceramic composite 5, the ceramic composite 5 is cooled from the state illustrated in FIG. 4A where the reduction reaction has occurred. This allows the reduction reaction to be completed.

Subsequently, in the reaction unit 21, the oxidation reaction represented by Formula (3) occurs to generate hydrogen gas inside the ceramic composite 5. According to the hydrogen production apparatus according to the present embodiment, the heat from the sunlight can be efficiently absorbed to increase the hydrogen generation efficiency.

As illustrated in FIGS. 4A and 4B, the reaction unit 21 may be contained in a container 22 in a reduced pressure state. This can prevent the heat generated by the light absorbing member 7 from moving to the outside other than the reaction unit 21. The heat can be efficiently supplied to the ceramic composite 5 in the reaction unit 21.

When the reaction unit 21 is in a state of reduced pressure, an oxygen defect tends to be formed on the ceramic composite 5 side of the reaction unit 21 and thus the reduction reaction of the ceramic composite 5 proceeds and the amount of oxygen generated from the ceramic composite 5 can be increased.

Subsequently, when steam is supplied to the ceramic composite 5 after the reaction unit 21 is reduced, the probability that oxygen becomes free from the molecules of water increases and the amount of generated oxygen can be increased. This allows the proportion of the generated hydrogen gas relative to the amount of supplied water vapor to be increased.

In this case, an intake port for sucking the gas from inside the container 22 is obviously required to be provided in the container 22 provided with the reaction unit 21. In the hydrogen production apparatus according to the present embodiment, the container 22 may have two intake ports 22a and 22b. In this case, when the schematic views illustrated in FIGS. 4A and 4B are used as an example, one of the two intake ports 22a and 22b (in this case, the intake port 22a) is used for reducing the pressure inside the whole container 22. The purpose of this arrangement is to reduce the transfer of the heat from the surroundings of the light absorbing member 7 to the surroundings of the container 22.

The other intake port (in this case, the intake port 22b) is provided in such a manner that the intake port passes through the light absorbing member 7 to reach the ceramic composite 5. The purpose of this arrangement is to control the internal pressure of the ceramic composite 5 being a member for hydrogen production in the reaction unit 21 located in the container 22. The purpose of this pressure control is, for example, to change the pressure to be higher than that of the surroundings of the light absorbing member 7. By this arrangement, when steam is supplied to the inside of the ceramic composite 5, the oxidation reaction tends to proceed inside the ceramic composite 5 and the amount of hydrogen gas to be generated can be further increased.

In the hydrogen production apparatus 20 according to the present embodiment, an upper surface plate 22c facing the shielding plate 29 side of the container 22 may have a window 22d for taking in sunlight. A transparent plate may be located in the window 22d. Glass having high heat resistance is suitable as the transparent plate. This allows sunlight to be efficiently taken in the container 22. In addition, the light absorbing member 7 and the ceramic composite 5 can be heated to a higher temperature. As a result, the temperature change of the light absorbing member 7 and the porous composite 5 is increased between the state in which the container 22 is not covered with the shielding plate 29 (FIG. 4A) and the state in which the container 22 is covered with the shielding plate 29 (FIG. 4B), whereby the reactivity of reduction and oxidation of the ceramic composite 5 can be further enhanced. This allows the amount of generated hydrogen gas to be further increased.

Figure 5A:
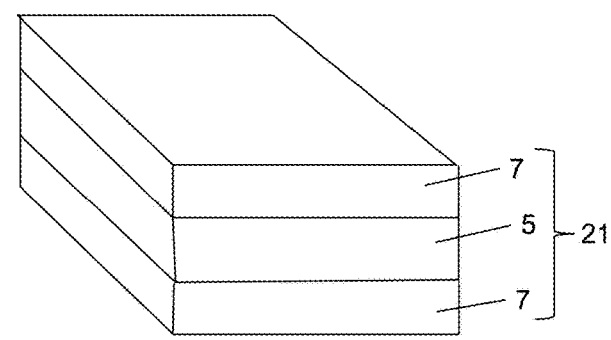
FIGS. 5A, 5B and 5C are perspective views schematically illustrating the appearance structures of reaction units.
Figure 5B:
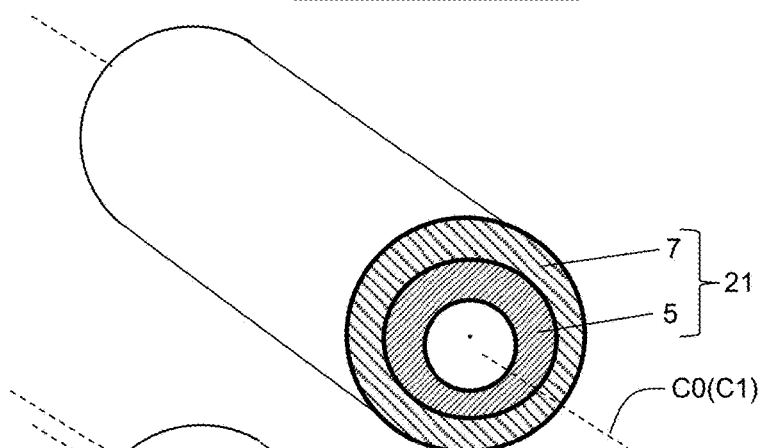
Figure 5C:
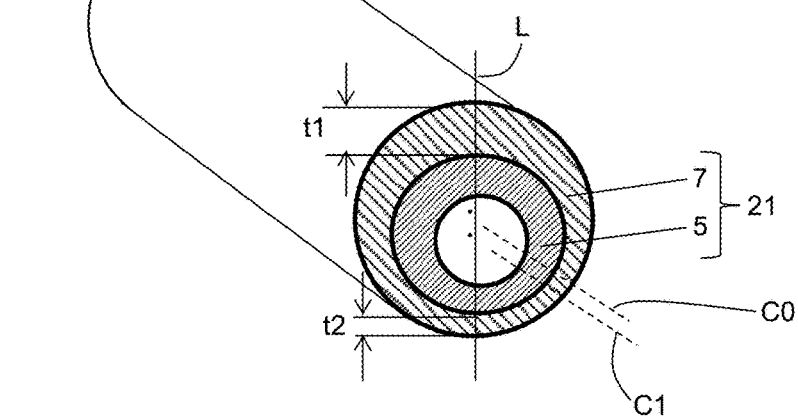

FIGS. 5A, 5B and 5C are perspective views schematically illustrating the appearance structures of reaction units. FIGS. 5A, 5B and 5C illustrate a flat plate type structure, a coaxial type of a hollow cylindrical structure, and a non-coaxial type of a hollow cylindrical structure, respectively.

As the reaction unit 21 constituting the hydrogen production apparatus 20 according to the present embodiment, a flat plate type laminated structure illustrated in FIG. 5A, a coaxial type of a hollow cylindrical tube type laminated structure illustrated in FIG. 5B, or a non-coaxial type of a hollow cylindrical tube type laminated structure illustrated in FIG. 5C is suitable.

With regard to the hollow cylindrical tube type laminated structure, the coaxial type laminated structure refers to a structure in which the central axis C1 of the section of the cylindrical ceramic composite 5 and the central axis C2 of the section of the cylindrical light absorbing member are on the same straight line. In other words, the structure is a structure in which the central axis C1 of the ceramic composite 5 located inside the reaction unit 21 overlaps with the central axis C0 when the circumference of the reaction unit 21 is a peripheral edge.

On the other hand, the non-coaxial type laminated structure refers to a structure in which the central axis C1 of the section of the cylindrical ceramic composite 5 and the central axis C2 of the section of the cylindrical light absorbing member do not overlap (non-coaxial structure). In other words, the center axis C1 of the ceramic composite body 5 located inside the reaction unit 21 exists on a line shifted from the center axis C0 when the circumference of the reaction unit 21 is the peripheral edge.

Namely, in the non-coaxial type structure, for example, the sectional thicknesses of the light absorbing member 7 have a relation of $t_1 > t_2$ and are different as illustrated in FIG. 5C. In this case, the section of the cylindrical ceramic composite 5 may have a similar shape to the sectional shape of the light absorbing member 7.

In the case of a flat plate type laminated structure, the structure has a shape in which the flat plate-like member for hydrogen production (ceramic composite 5) is sandwiched between the light absorbing members 7 from the upper side and the lower side and thus the thickness of the apparatus can be reduced. This allows the weight to be reduced and thus the apparatus is suitable for installation on the roof of a house or the like.

The hollow cylindrical tube type laminated structure has a structure in which the cylindrical light absorbing member 7 surrounds the outside of the cylindrical ceramic composite 5 and thus the surface area of the light absorbing member 7 can be increased when the structure is formed in such a manner that a plurality of hollow cylindrical tube type reaction units 21 are arranged in parallel. This allows the reaction unit 21 having a high light absorption ratio to be completed.

With regard to the hollow cylindrical tube type laminated structure, the non-coaxial type of the hollow cylindrical tube type laminated structure may improve the light absorption rate as compared to the coaxial type of the hollow cylindrical tube type laminated structure; however, both types of structures may be used. In the case of the non-coaxial type of the hollow cylindrical tube type laminated structure, as illustrated in FIG. 5C, when the thicker section of the light absorbing member 7 is placed at the upper side irradiated with sunlight, the volume proportion of the light absorbing member 7 can be increased. This allows the light absorption amount to be increased.

At this time, when the shape of the section of the cylindrical ceramic composite 5 and the shape of the section of the light absorbing member 7 are similar and the thicker side of the ceramic composite 5 and the thicker side of the section of the light absorbing member 7 are at the same side with respect to the central axis C0, both of the amount of light absorption and the amount of generated hydrogen can be simultaneously increased in the direction where the side is irradiated with sunlight.

Figure 6A:
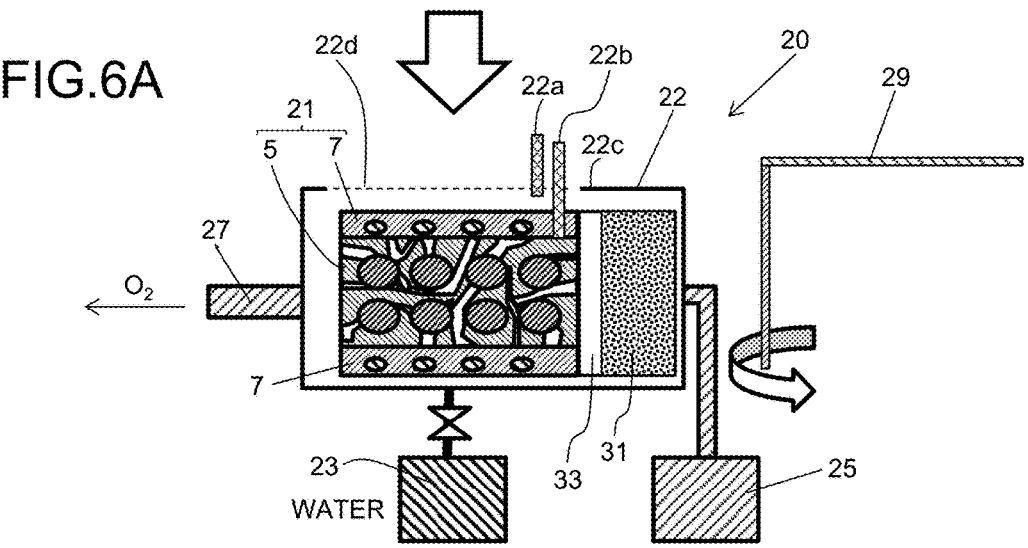
FIGS. 6A and 6B illustrate other aspects of the hydrogen production apparatus according to the present embodiment and are schematic sectional views illustrating constitutions in which a hydrogen absorbing member is provided adjacent to the reaction unit of the hydrogen production apparatus illustrated in FIGS. 4A and 4B.
Figure 6B:
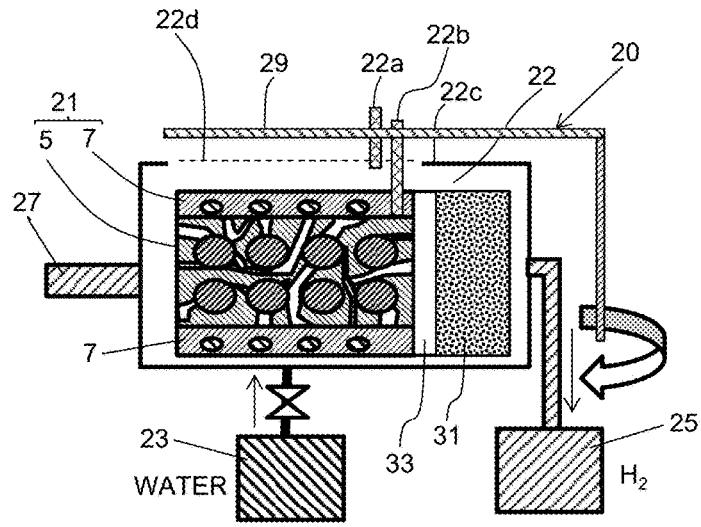

FIGS. 6A and 6B illustrate other aspects of the hydrogen production apparatus according to the present embodiment and schematic sectional views illustrating the constitution in which a hydrogen absorbing member is provided adjacent to the reaction unit of the hydrogen production apparatus illustrated in FIGS. 4A and 4B.

In the hydrogen production apparatus according to the present embodiment, a hydrogen absorbing member 31 may be provided in the reaction unit 21 for generating hydrogen. In this case, a hydrogen absorption alloy exemplified below may be applied as the hydrogen absorbing member 31. When the hydrogen absorbing member 31 is located adjacent to the reaction unit 21, the hydrogen gas discharged from the reaction unit 21 can be temporarily stored in the hydrogen absorbing member 31 being a solid.

In this case, the amount of hydrogen in the container 22 containing the reaction unit 21 can be temporarily reduced and thus the hydrogen generation reaction represented by Formula 3 can be moved to the right side. This allows the generation rate of hydrogen to be increased. In addition, the volume of the generated hydrogen gas can be reduced and thus the size of the container 22 in which the reaction unit 21 is contained and recovery unit 25 can be reduced.

In the hydrogen production apparatus, the hydrogen absorbing member 31 is not located in contact with the reaction unit 21 but may be located at a location such that there is a space 33 between the hydrogen absorbing member 31 and the reaction unit 21 as illustrated in FIGS. 6A and 6B. When the hydrogen absorbing member 31 is located at a location such that the space 33 is between the hydrogen absorbing member 31 and the reaction unit 21, hydrogen generated in the reaction unit 21 can be temporarily stored in the space 33 and thus the speed at the time of absorption of hydrogen into the hydrogen absorbing member 31 can be controlled and the hydrogen production reaction represented by Formula 3 can be stabilized.

Examples of hydrogen absorbing alloys applicable to the hydrogen absorbing member 31 include alloys based on alloys of transition elements such as titanium, manganese, zirconium, and nickel, which are AB2 types, alloys based on alloys ($LaNi_5$, $ReNi_5$, and the like) including transition elements (nickel, cobalt, aluminum, and the like) having a catalytic effect on rare earth elements, niobium, and zirconium, which are AB5 types, Ti—Fe-based ally, V-based alloy, Mg alloy, Pd-based alloy, Ca-based alloy, and/or the like.

EXAMPLES

Hereinafter, members for hydrogen production were prepared so as to have the constitution listed in Table 1 and whether the members for hydrogen production produced hydrogen was evaluated.

In this case, a perovskite material containing $La_{0.8}Sr_{0.2}MnO_3$ as the main component and substituting the Mn site with 0.5 mol of Fe was used for the ceramic composite. This perovskite material was synthesized by providing each metal alkoxide, preparing these metal alkoxides so as to be the above composition, and thereafter carrying out spray thermal decomposition. Subsequently, the synthesized powder was poured into water and classification operation was carried out by checking a sedimentation state every predetermined time to give the powder of the perovskite material (ceramic particles) having an average particle diameter listed in Table 1.

Subsequently, a glass powder (borosilicate glass) was mixed with the obtained perovskite material powder to prepare a composite powder. In this case, the composition of the mixed powder was prepared in such a manner that the perovskite material powder was 70% by mass and the glass powder was 30% by mass. This proportion is a proportion in which the proportion of the perovskite material in the ceramic composite is 45% by volume.

Subsequently, 10% by mass of PVA (polyvinyl alcohol) as an organic binder was added to the obtained composite powder to prepare a molded article. After the molded article was degreased, a ceramic composite was prepared by heating the molded article in the air using an infrared image furnace under conditions of a maximum temperature of 1400° C. and a retention time of about 1 second. As Comparative Example, a sample prepared from the molded article using the perovskite material powder alone was prepared and evaluated in the same manner (Sample No. 9).

The prepared ceramic composite was polished in such a manner that the ceramic composite had a size of 10 mm×10 mm×5 mm. The section of the prepared ceramic composite was analyzed using an electron microscope and an analyzer (EPMA) provided to the electron microscope. In this case, the ceramic particles constituting the ceramic composite had little particle growth and the average particle diameter was almost equal to the values listed in Table 1. Except for Sample No. 9, it was confirmed that the ceramic particles existed in an isolated state in a ratio in the number of particles of 90% or more in the glass phase.

For the light absorbing member, a metal particle-containing composite in which about 30% by mass of tungsten particles having an average particle diameter of 40 nm were dispersed in silica glass was applied. A sample (Sample No. 8) in which a metal film (Au) was formed between layers of the ceramic composite and the light absorbing member was also prepared and evaluated in the same manner. As the reaction unit, the structure illustrated in (a) and (b) of FIG. 2 was applied.

The amount of generated hydrogen gas was measured by installing a gas chromatograph apparatus in the recovery unit of the hydrogen production apparatus. In this case, in the hydrogen production apparatus, the pressure of the reaction unit formed with the light absorbing member and the ceramic composite was reduced and then the reaction part received sunlight in a state of 1 SUN. The generated amount obtained through 10 cycles is listed in Table 1.

TABLE 1

| Sample No. | Average particle diameter of ceramic particles nm | Presence or absence of light absorbing member | Presence or absence of metal film | Amount of generated hydrogen ml/g |
|---|---|---|---|---|
| 1 | 6 | Absence | Absence | 0.5 |
| 2 | 15 | Absence | Absence | 0.6 |
| 3 | 55 | Absence | Absence | 1.1 |
| 4 | 110 | Absence | Absence | 1 |
| 5 | 190 | Absence | Absence | 0.7 |
| 6 | 280 | Absence | Absence | 0.01 |
| 7 | 55 | Presence | Absence | 1.6 |
| 8 | 55 | Presence | Presence | 1.9 |
| 9 | 55 | Absence | Absence | 0 |

As is clear from the results of Table 1, it was confirmed that the amount of generated hydrogen of Sample Nos. 1 to 5, 7 and 8 had an amount of 0.5 ml/g or larger, whereas the amount of generated hydrogen was 0.01 ml/g or smaller in the case of the sample (Sample No. 6) having an average particle diameter of 280 nm or larger and the sample (Sample No. 9) prepared by sintering the ceramic particles alone.

The samples (Sample Nos. 7 and 8) provided with the light absorbing member generated a larger amount of hydrogen than the sample (Sample No. 3) prepared using the same ceramic particles.

In the hydrogen production apparatus using the ceramic composite of Sample No. 8 as the member for hydrogen production, $LaNi_5$ was attached to the reaction unit as the hydrogen absorbing member in the constitution illustrated in FIG. 6 and the hydrogen production apparatus was operated. In this case, the amount of generated hydrogen was 1.5 times higher than that of the Sample No. 8.

The invention claimed is:

1. A member for hydrogen production, the member comprising:
    a ceramic composite comprising a plurality of ceramic particles having an average particle diameter ranging from 5 nm to 200 nm; wherein the plurality of ceramic particles are dispersed in a porous insulator having a different composition from the ceramic particles, wherein
    the ceramic particles comprise at least one substance selected from the group consisting of $AXO_{3\pm\delta}$ (where $0\le\delta\le1$, wherein A represents at least one of rare earth elements, alkaline earth elements, alkali metal elements, and combinations thereof; wherein X represents at least one of transition metal elements, metalloid elements, and combinations thereof and wherein O represents oxygen), cerium oxide, and zirconium oxide.

2. The member for hydrogen production according to claim 1, wherein the proportion of the ceramic particles in the ceramic composite ranges from 20% by volume to 80% by volume.

3. The member for hydrogen production according to claim 1, wherein a number of ceramic particles of the plurality of ceramic particles existing in an isolated state is 90% or more.

4. The member for hydrogen production according to claim 1, wherein a light absorbing member is provided on the ceramic composite.

5. The member for hydrogen production according to claim 4, wherein the light absorbing member is a metal particle-containing composite in which metal particles are dispersed in a dielectric substance or a metal-based film laminated product in which a metal-based film and a dielectric substance are laminated.

6. The member for hydrogen production according to claim 4, wherein a metal film is provided between the ceramic composite and the light absorbing member.

7. A hydrogen production apparatus according to claim 4, further comprising:
   a reaction unit configured to cause oxidation-reduction reactions by receiving solar energy,
   a water supply unit configured to supply water to the reaction unit, and
   a recovery unit configured to recover hydrogen gas generated from the reaction unit, wherein
   the member for hydrogen production is provided in the reaction unit.

8. The hydrogen production apparatus according to claim 7, further comprising a pressure-reducible container; wherein the reaction unit is contained in the pressure-reducible container.

9. The hydrogen production apparatus according to claim 8, wherein the pressure-reducible container comprises two or more intake ports.

10. The hydrogen production apparatus according to claim 9, wherein one of the two intake ports is used for reducing pressure inside the pressure-reducible container and the other is used for reducing pressure inside the reaction unit.

11. The hydrogen production apparatus according to claim 8, wherein the pressure-reducible container is provided with a window for taking in sunlight.

12. The hydrogen production apparatus according to claim 7, wherein the reaction unit is a flat plate type laminated structure in which the ceramic composite having a flat plate-like shape is sandwiched from an upper side and a lower side by the light absorbing members having a flat plate-like shape.

13. The hydrogen production apparatus according to claim 7, wherein the reaction unit is a hollow cylindrical laminated structure in which the ceramic composite having a cylindrical shape is surrounded by the light absorbing member having a cylindrical shape.

14. The hydrogen production apparatus according to claim 13, wherein the hollow cylindrical laminated structure is a non-coaxial structure in which a central axis of a section of the cylindrical ceramic composite does not overlap with a central axis of a section of the cylindrical light absorbing member.

15. The hydrogen production apparatus according to claim 7, wherein a hydrogen absorbing member is provided adjacent to the reaction unit.

* * * * *